T. L. RANKIN.
PIPE-CONNECTIONS FOR ICE-MACHINES.

No. 179,605. Patented July 4, 1876.

WITNESSES
Henry N. Miller
Franck L. Durand

INVENTOR
Thos. L. Rankin
By Alexander Mason
Attorneys

UNITED STATES PATENT OFFICE.

THOMAS L. RANKIN, OF EMPORIA, KANSAS.

IMPROVEMENT IN PIPE-CONNECTIONS FOR ICE-MACHINES.

Specification forming part of Letters Patent No. 179,605, dated July 4, 1876; application filed May 26, 1876.

*To all whom it may concern:*

Be it known that I, THOMAS L. RANKIN, of Emporia, in the county of Lyon and in the State of Kansas, have invented certain new and useful Improvements in Pipe-Connections for Ice-Machines; and I do hereby declare that the following is a full, clear, and exact description thereof, reference being had to the accompanying drawings, and to the letters of reference marked thereon, making a part of this specification.

The nature of my invention consists in the construction and arrangement of a pipe-coupling or pipe-connection, designed especially for ice-machines, as will be hereinafter more fully set forth.

In order to enable others skilled in the art to which my invention appertains to make and use the same, I will now proceed to describe its construction and operation, referring to the annexed drawing, in which—

Figure 1:
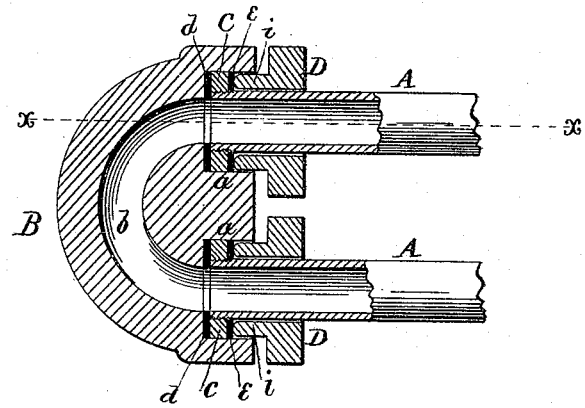
Figure 2:
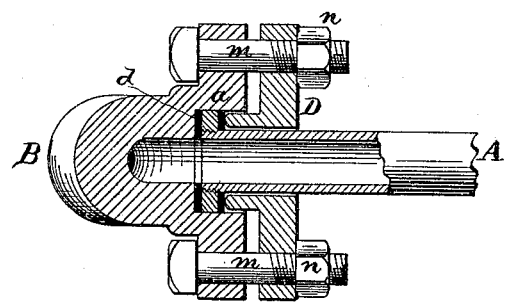

Figure 1 is longitudinal section of my pipe-coupling. Fig. 2 is a section through the line $x\ x$, Fig. 1.

My pipe coupling or connection is intended particularly for ice-machines, or where return-bends are required.

A A represent the pipes that are to be connected, and B is the connection. The connection B is made in semicircular form, with a semicircular passage, $b$. At each end of this passage is made a recess, $a$, of larger diameter than that of the passage, and on the bottom of said recess is placed a packing-ring, $d$.

The end of the pipe A is provided with exterior screw-threads, and on the same is screwed a collar, C, to be flush with the end of the pipe. The pipe and collar are placed in the recess on the packing-ring $d$. Another packing-ring, $e$, is placed around the pipe on the collar, as shown. D is a cast plate, with central orifice and projecting hub $i$, which is placed over the pipe A with the hub entering the recess $a$ in the connection B, on top of the packing-ring $e$. Bolts $m\ m$ are then passed through ears $h\ h$ on the connection, and through the ends of the plate D, with nuts $n\ n$ screwed on the ends of the bolts. By tightening these nuts the parts are held closely together, making a liquid and gas-tight joint. Both pipes A A are connected in the same manner.

Having thus fully described my invention, what I claim as new, and desire to secure by Letters Patent, is—

The combination of the pipes A A, with screw-collars C C, the coupling B, provided with passage $b$ and recesses $a\ a$, packing-rings $d\ e$, plates D, with hubs $i$, and bolts $m$, with nuts $n$, all substantially as and for the porposes herein set forth.

In testimony that I claim the foregoing I have hereunto set my hand this 24th day of April, 1876.

THOS. L. RANKIN.

Witnesses:
 C. HOOD,
 P. R. PLUMB.